United States Patent Office 2,942,001
Patented June 21, 1960

2,942,001
PIPERAZO-PYRIDAZINES

Jean Druey, Riehen, and Konrad Meier, Basel, Switzerland, assignors to Ciba Pharmaceutical Products Inc., Summit, N.J.

No Drawing. Filed Oct. 28, 1957, Ser. No. 692,564

Claims priority, application Switzerland Nov. 16, 1956

11 Claims. (Cl. 260—268)

This invention relates to heterocyclic compounds having a new ring system consisting of two condensed heterocyclic nuclei and a process for the manufacture of these compounds. More particularly the invention concerns piperazo-[c]-pyridazines containing the nucleus of the formula

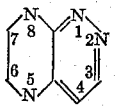

which contain in the 5- and 8-positions unsubstituted or substituted alkyl or aralkyl groups, and salts thereof.

As alkyl or aralkyl groups there are preferred methyl, ethyl, propyl, butyl or benzyl groups. As substituents of these radicals there come into consideration, for example, free or substituted amino groups, e.g. di-lower alkylamino groups, etherified hydroxyl or mercapto groups e.g. lower alkoxy or alkylmercapto groups or halogen atoms, e.g. chlorine, bromine or iodine or at the aryl radical also lower alkyl radicals.

Apart from the substituents referred to above in the 5- and 8-positions, the new compounds may be substituted in any manner, for example in 6- or 7-position by hydrocarbon radicals, preferably lower alkyl groups, and/or in the 3-position by a halogen atom, such as a chlorine or bromine atom, a free or etherified hydroxyl or mercapto group, such as a lower alkoxy or lower alkylmercapto group, or a free or substituted amino group, such as a lower dialkylamino group.

The new compounds possess valuable pharmacological properties. They increase motility, and excite the central nervous system. Consequently, they can be used as stimulants. They are also valuable intermediate products for the manufacture of medicaments. Especially active as stimulants are 8-methyl- and 8-ethyl-3-chloro-5-benzyl-piperazo-[c]-pyridazine, which form a preferred and specific embodiment of the invention.

As stated above, a further object of the invention is a novel and unobvious process for making the aforesaid piperazo-pyridazines. In this process a 3:4-dihalogen-pyridazine is reacted with a secondary-tertiary ethylene diamine, in which any substituents in the secondary and tertiary amino group are unsubstituted or substituted alkyl or aralkyl groups. The reaction to form the piperazo-[c]-pyridazine can be carried out directly or in stages.

The direct reaction is illustrated by the following formulae

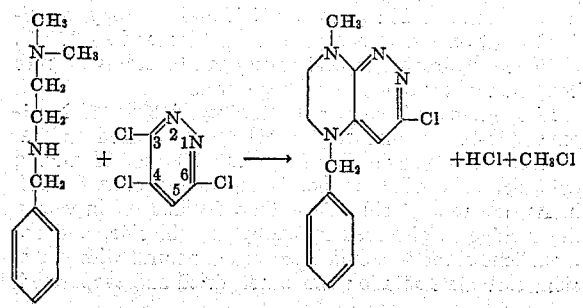

The new process must be regarded as unexpected. Thus, for example, experiments have shown that the reaction of 3:4:6-trichloropyridazine both with unsubstituted ethylene diamine and with N:N-diethyl-ethylene diamine does not lead to the formation of a piperazo-[c]-pyridazine compound.

As pyridazine starting materials there are used preferably 3:4:6-trihalogen-pyridazines, such as 3:4:6-trichloropyridazine. The ethylene diamines to be used in the process may also contain substituents, for example, in the ethylene radical lower alkyl groups, or in the N-substituents free or substituted amino or etherified hydroxyl or mercapto groups or halogen atoms. Preferably there are used N:N-dialkyl- or N:N-diaralkyl-N'-monoalkyl- or -monoaralkyl-ethylene diamines. The starting materials may be used in the form of salts thereof, and it is advantageous to work in the presence of a condensing agent.

The process may be carried out in stages, for example, by first exchanging the halogen atom in the 4-position of the pyridazine directly or in stages for the tertiary-amino-ethylamino group, and then bringing about ring closure in the 3-position. Thus, the halogen atom in the 4-position of the pyridazine may first be reacted with an ethylamine, which contains at the nitrogen atom an unsubstituted or substituted alkyl or aralkyl group and in the β-position a hydroxyl group. In the subsequent stages the latter hydroxyl group is reactively esterified, for example, with a hydrohalic acid such as hydrochloric acid, by reaction with a chlorinating agent, e.g. thionyl chloride and the compound obtained reacted with a secondary amine, whose substituents are unsubstituted or substituted alkyl or aralkyl groups, whereby ring closure is brought about. During the exchange of the reactively esterified hydroxyl group for the tertiary amino group it is possible, depending on the reaction conditions, also to exchange other reactively esterified hydroxyl groups, especially a halogen atom such as chlorine, for example, in the 6-position of the pyridazine, for tertiary amino groups.

The reactions are carried out by methods in themselves known, for example, in the presence or absence of a diluent and/or a condensing agent and/or a catalyst at the ordinary or advantageously a raised temperature in an open vessel or a closed vessel under pressure.

In the compounds so obtained any substituents may be exchanged in the usual manner or replaced by hydrogen atoms. Thus, hydroxyl or mercapto groups may be etherified or esterified or exchanged for halogen atoms, or hydroxyl groups may be exchanged for sulfur atoms. Free or etherified mercapto groups may be exchanged for amino groups, halogen atoms may be exchanged for hydroxyl groups or for etherified hydroxyl or mercapto groups or for amino groups or for hydrogen. The exchange of a halogen atom for an etherified hydroxyl group, such as an alkoxy group, is brought out for example by reaction with a metal salt of the corresponding alcohol, the exchange for an amino group by reaction with the corresponding amine. Substitution by hydrogen is preferably carried out catalytically, for example in the presence of Raney nickel or a palladium catalyst.

Depending on the nature of the substituents in the products of the process they can be converted into various salts. Compounds of basic character, especially those having basic substituents, form salts with inorganic or organic acids. As acids there may be used those which are commonly used for the preparation of therapeutically useful acid addition salts, for example, hydrohalic acids, sulfuric acids, phosphoric acids, nitric acid, perchloric acid; aliphatic, alicyclic, aromatic or heterocyclic carboxylic acids, or sulfonic acids, such as formic acid, acetic acid, propionic acid, oxalic acid, succinic acid, glycollic acid, lactic acid, malic acid, tartaric acid, citric acid, ascorbic acid, oxymaleic acid, dioxymaleic acid or pyroracemic acid; phenylacetic acid, benzoic acid, para-aminobenzoic acid, anthanilic acid, paraoxybenzoic acid, salicylic acid or para-amino-salicylic acid; methane sulfonic acid, ethane sulfonic acid, oxyethane sulfonic acid or ethylene sulfonic acid; toluene sulfonic acids, naphthalene sulfonic acids, or sulfanilic acid; or methionine, tryptophane, lysine or arginine.

The starting materials used in the process are known or can be made by customary methods.

The above described piperazopyridazines, their salts or mixtures thereof can be used, for example, in the form of pharmaceutical preparations. These preparations contain the active compound in admixture with a pharmaceutical organic or inorganic carrier suitable for enteral or parenteral administration. As carriers there may be used substances that do not react with the compounds of the invention, for example, gelatine, lactose, starches, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets or dragees or in liquid form as solutions, suspensions or emulsions. If desired, they may be sterilized and/or may contain auxiliary substances such as preserving, stabilising, wetting or emulsifying agents. They may also contain other therapeutically valuable substances. The preparations are made by the usual methods.

The following examples illustrate the invention:

Example 1

9.1 grams of 3:4:6-trichloropyridazine are boiled under reflux for 16 hours with 17 grams of N:N-dimethyl-N'-benzyl-ethylene diamine in 100 cc. of absolute alcohol. The solvent is then distilled off in vacuo, the oily residue is dissolved in dilute hydrochloric acid, and the solution is extracted with ether in order to remove neutral constituents. The acid solution is rendered alkaline by the addition of potassium carbonate and the precipitated basic constituents are extracted with methylene chloride. After distilling off the methylene chloride, 19.2 grams of a partially crystalline basic mixture remains behind, from which the liquid original base is removed by trituration with ether and separation of the crystalline constituents by filtering with suction. The crystallisate (8.5 grams) is recrystallized from a mixture of methanol and ether. The 3-chloro-5-benzyl-8-methyl-piperazo-[c]-pyridazine of the formula

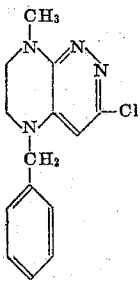

so obtained forms colorless crystals melting at 127–127.5° C.

7.0 grams of this crystalline base are dissolved in methanol, 25.5 cc. of 1 N-hydrochloric acid are added, the solution is completely evaporated to dryness in vacuo, and the residue is recrystallized from a mixture of absolute alcohol and absolute ether. The hydrochloride so obtained, which is colorless, melts at 206–208° C. It undergoes hydrolysis in water, so that hydrochloric acid is liberated and the water-insoluble base crystallises out.

Example 2

237 grams of N:N-diethyl-N'-benzyl-ethylene diamine (1.15 mols) are boiled under reflux for 17 hours with 102.4 grams of 3:4:6-trichloropyridazine (0.58 mol) in 1000 cc. of absolute alcohol. The solvent is then distilled off in vacuo, the residue is dissolved in 2 N-hydrochloric acid, the solution is filtered with charcoal, and then rendered alkaline, while cooling and stirring, by adding an aqueous saturated solution of potassium carbonate dropwise. The base precipitates in crystalline form and is filtered off with suction, washed with water, dried in vacuo, and then recrystallized from alcohol. The yield amounts to 97 grams. The resulting 3-chloro-5-benzyl-8-ethyl-piperazo-[c]-pyridazine of the formula

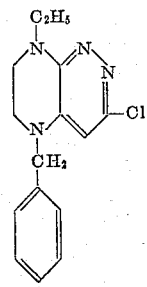

forms large pale yellow prisms melting at 111.5–112.5° C.

Example 3

20.6 grams of N:N-diethyl-N'-benzyl-ethylene diamine (0.1 mol) are boiled under reflux for 24 hours with 18.3 grams of 3:4:6-trichloropyridazine (0.1 mol) and 20 grams of triethylamine in 150 cc. of absolute alcohol. The volatile constituents are then distilled off in vacuo on a water bath, the residue is dissolved in 2 N-hydrochloric acid, the solution is filtered with charcoal, and then rendered alkaline by the addition of potassium carbonate, while stirring and cooling with ice. The precipitated base so obtained in crystalline form is dissolved in methylene chloride, the solution is washed with water, dried with anhydrous sodium sulfate, and then evaporated. The crystalline residue (18.4 grams) is identical with the 3-chloro-5-benzyl-8-ethyl-piperazo-[c]-pyridazine described in Example 2.

Example 4

183.5 grams of 3:4:6-trichloro-pyridazine (1 mol) are boiled under reflux in 600 cc. of absolute alcohol with 302 grams of N-benzyl-aminoethanol (2 mols) for 20 hours. The greater part of the alcohol is then distilled off in vacuo. The residue crystallises on standing. The crystallizate is filtered off with suction, washed with alcohol, and then dried (137 grams). The alkaline mother liquors are evaporated in vacuo. The residue is dissolved in methylene chloride and the solution is washed with 2 N-hydrochloric acid, dried with sodium sulfate and evaporated. The residue is recrystallized from alcohol to yield 87 grams of crystals. In this manner there is obtained a total of 224 grams of N-[3:6-dichloropyridazyl-(4)]-N-(β-oxyethyl)-benzylamine melting at 98–100° C. From the hydrochloric acid washings 116 grams of pure benzyl-aminoethanol can be recovered.

59.6 grams of N-[3:6-dichloro-pyridazyl-(4)]-N-(β-oxyethyl)-benzylamine (0.2 mol) are pulverized and introduced slowly, while stirring, into 200 cc. of thionyl chloride. The whole is then boiled under reflux for 2½ hours, the thionyl chloride is then distilled off in vacuo, the residue is dissolved in methylene chloride, and the methylene chloride solution is washed neutral with potassium carbonate solution and water, dried and evaporated.

The residue (62.5 grams) is recrystallized from a mixture of acetone and petroleum ether. The resulting N-[3:6 - dichloropyridazyl - (4)] - N - (β - chlorethyl)-benzylamine forms colorless prisms melting at 80–80.5° C. The yield amounts to 54.2 grams.

15.8 grams of N-[3:6-dichloropyridazyl-(4)]-N-(β-chlorethyl)-benzylamine (0.05 mol) are heated in a steel tube for 6 hours at 120–130° C. with 150 cc. of an alcoholic solution of dimethylamine of 30 percent strength and 200 cc. of absolute alcohol. The mixture is then evaporated to dryness, the residue is mixed with an aqueous solution of potassium carbonate and the solution is extracted with methylene chloride. After being evaporated, the methylene chloride solution leaves behind a crystalline residue which is then recrystallized from acetone. There are obtained 10.8 grams of 3-dimethyl-amino-5-benzyl-8-methyl-piperazo-[c]-pyridazine of the formula

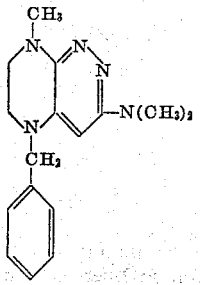

which melts at 168–169° C.

Example 5

134 grams of 3:4:6-trichloropyridazine are boiled for 6 hours under reflux with 165 grams of bis-(β-oxyethyl)-amine in 400 cc. of alcohol. The alcohol is then distilled off in vacuo and the residue is recrystallized from water. The resulting 4-[bis-(β-oxyethyl)-amino]-3:6-dichloro-pyridazine forms colorless crystals melting at 129–130° C.

25.2 grams of 4-[bis-(β-oxyethyl)-amino]-3:6-dichloro-pyridazine (0.1 mol) are introduced, while stirring into 100 cc. of thionyl chloride, and the mixture is boiled under reflux for 2 hours. It is then evaporated to dryness in vacuo, and the crude 4-[bis-(β-chlorethyl)-amino]-3:6-dichloro-pyridazine which remains behind as a residue is dissolved in 100 cc. of absolute alcohol and then 200 cc. of an alcoholic solution of dimethylamine of 35 percent strength are added, and the mixture is heated in a steel tube for 6 hours at 120–130° C. The solution is evaporated in vacuo, the residue is mixed with an aqueous solution of potassium carbonate and extracted with methylene chloride. The dried methylene chloride solution, when evaporated, leaves behind a crystalline somewhat greasy residue, which is dissolved in 500 cc. of hot isopropyl ether. The hot solution is filtered with active charcoal and then concentrated to 100 cc. The resulting 3 - chloro-5 - (β - dimethyl - amino - ethyl) - 8 - methyl-piperazo-[c]-pyridazine of the formula

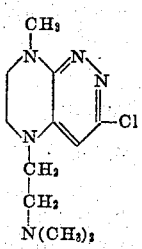

crystallizes in colorless lamellae melting at 116–117° C. The yield amounts to 14.3 grams.

The hydrochloride prepared in a manner analogous to that described in Example 1 melts at 241–243° C.

The 4-[bis-(β-chlorethyl)-amino]-3:6-dichloropyridazine referred to above and worked up directly as a crude product crystallises from ether in colorless prisms melting at 55–55.5° C.

Example 6

7.1 grams of 3:4:6-trichloropyridazine (0.038 mol) are boiled under reflux for 15 hours with 7.9 grams of N:N:N'-trimethyl-ethylene diamine (0.077 mol) in 100 cc. of absolute alcohol. The mixture is then evaporated in vacuo, the residue is dissolved in dilute hydrochloric acid, and the clear solution obtained by filtration is saturated with potassium carbonate. The basic constituents are extracted with methylene chloride. The methylene chloride solution is dried with sodium sulfate and the solvent is distilled off. 8.1 grams of a crystalline residue remain behind. The 3-chloro-5:8-dimethyl-piperazo-[c]-pyridazine so obtained and having the formula

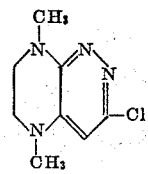

crystallises from water in colorless felted needles melting at 124–124.5° C.

Example 7

18.3 grams of 3:4:6-trichloropyridazine (0.1 mol) are boiled under reflux for 20 hours with 24.9 grams of N:N - diethyl - N' - (para - dimethylamino - benzyl) - ethylene diamine (0.1 mol) and 20 cc. of triethylamine in 150 cc. of absolute alcohol. After distilling off the alcohol, the residue is dissolved in 2 N-hydrochloric acid, extracted with ether, and then the aqueous hydrochloric acid solution is rendered alkaline with potassium carbonate. The precipitated base is taken up in methylene chloride, the methylene chloride solution is washed several times with water, dried with sodium sulfate and then evaporated. By recrystallising the residue from a mixture of alcohol and water there are obtained 14.4 grams of 3-chloro-5-(para - dimethylamino-benzyl)-8-ethyl-piperazo-[c]-pyridazine of the formula

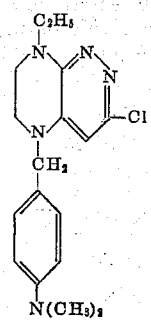

It melts at 134–135° C.

The N:N-diethyl-N'-(para-dimethylamino-benzyl)-ethylene diamine used as starting material can be prepared as follows:

149 grams of para-dimethylamino-benzaldehyde dissolved in 300 cc. of benzene are mixed, while agitating, with 120 grams of N:N-diethyl-ethylene diamine. The mixture is then boiled under reflux with the use of a water-separator until water is no longer collected. After distilling off the benzene, the N:N-diethyl-N'-(para-dimethylamino-benzal)-ethylene diamine is distilled through a column under a high vacuum. The product boils at 142–152° C. under 0.08 to 0.12 mm. of mercury. The yield amounts to 211 grams. The Schiff's base so obtained is hydrogenated in a hydrogenating autoclave with the addition of 150 cc. of methanol with the use of 25 grams of Rupe nickel at 80 atmospheres pressure of hydrogen and 50° C. The resulting N:N-diethyl-N'-(para-dimethylamino-benzyl)-ethylene diamine distils at 132–133° C. under 0.09 mm. of mercury in the form of an almost colorless oil. The yield amounts to 163.9 grams.

*Example 8*

18.3 grams of 3:4:6-trichloropyridazine are boiled under reflux for 20 hours with 47.2 grams of N:N-diethyl-N'-(meta-methoxy-benzyl)-ethylene diamine in 200 cc. of absolute alcohol. By working up in the manner described in Example 2 the crude base is obtained and is then recrystallized from a mixture of alcohol and ether. The resulting 3-chloro-5-(meta-methoxy-benzyl)-8-ethyl-piperazo-[c]-pyridazine of the formula

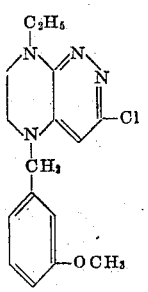

forms large colorless prisms melting at 108–109° C. The yield amounts to 14.5 grams.

The N:N-diethyl-N'-(meta-methoxy-benzyl)-ethylene diamine used as starting material is prepared from meta-methoxy-benzaldehyde and N:N-diethyl-ethylene diamine in the manner described in Example 7. It distils at 135–137° C. under 0.2 mm. pressure of mercury.

*Example 9*

18.3 grams of 3:4:6-trichloropyridazine (0.1 mol) are boiled under reflux for 20 hours with 48 grams of N:N-diethyl-N'-(para-chlorobenzyl)-ethylene diamine (0.2 mol) in 200 cc. of absolute alcohol. After working up in the manner described in Example 2 the crystalline crude base so formed is recrystallized from alcohol. The resulting 3-chloro-5-(para-chlorobenzyl)-8-ethyl-piperazo-[c]-pyridazine of the formula

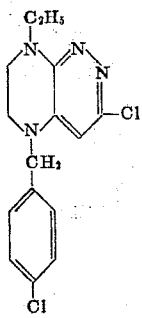

forms colorless prisms melting at 156.5–157.5° C. The yield amounts to 19.6 grams.

The N:N-diethyl-N'-(para-chlorobenzyl)-ethylene diamine used as starting material is prepared from para-chlorobenzaldehyde and N:N-diethyl-ethylene diamine in the manner described in Example 7. It boils at 165–167° C. under 12 mm. pressure of mercury.

*Example 10*

18.3 grams of 3:4:6-trichloropyridazine are boiled under reflux with 20.6 grams of 1-dimethylamino-2-benzylamino-butane and 15 grams of triethyl-amine in 100 cc. of absolute ethanol for 14 hours. The ethanol is then distilled off, the residue acidified with 2 N-hydrochloric acid and freed from acid-insoluble constituents by extraction with ether. The acid solution is rendered alkaline by the addition of 10 N-caustic soda solution and extracted with benzene. After distilling off the benzene, the residue is recrystallized from a mixture of ethanol and ether. 3-chloro-5-benzyl-6-ethyl-8-methyl-piperazo-[c]-pyridazine of the formula

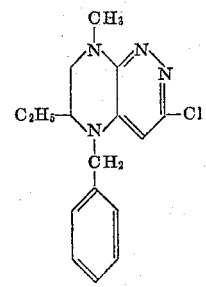

forms yellowish prisms melting at 145–146° C.

The 1-dimethylamino-2-benzylamino-butane used as starting material can be prepared as follows:

500 cc. of concentrated hydrochloric acid are added to 445 grams of 2-amino-1-butanol with cooling, and the water is distilled off in vacuo. The last traces of water are removed by azeotropic distillation with toluene. The dry hydrochloride is heated with 1500 cc. of toluene at 95–100° C. 490 cc. of thionyl chloride are added dropwise in the course of 5 hours. The whole is then stirred for 3 hours at 105–110° C., cooled, suction-filtered, washed with toluene and ether and the grey-brown, crude hydrochloride of 1-chloro-2-aminobutane dried in vacuo.

460 grams of the above hydrochloride are introduced in portions in the course of 2 hours into 1100 cc. of aqueous dimethylamine solution of 40% strength with stirring, the temperature being maintained at 20–30° C. with ice-cooling. The mixture is stirred for 17 hours at room temperature and then 2 hours at 70–80° C. After cooling, the mixture is saturated with solid pulverized sodium hydroxide with ice-cooling and extracted several times with n-hexane. After drying with potassium hydroxide pills, the hexane is distilled off and the base fractionated in vacuo. 1-dimethylamino-2-aminobutane boils at 57° C. under 40 mm. pressure of mercury.

116 grams of this diamine are dissolved in 500 cc. of benzene, 106 grams of freshly distilled benzaldehyde are added and the mixture boiled under reflux with a water-separator until no more water separates. The benzene is distilled off and 1-dimethylamino-2-benzalaminobutane distilled in vacuo. It has a boiling point of 135–136° C. under 12 mm. pressure of mercury.

189 grams of this Schiff's base are dissolved in 200 cc. of methanol and hydrogenated with 20 grams of Raney nickel at room temperature and 60 atmospheres gauge pressure until hydrogen is no longer taken up. The resulting 1-dimethylamino-2-benzylaminobutane distils at 128–129° C. under 12 mm. pressure or mercury.

*Example 11*

18.3 grams of 3:4:6-trichloropyridazine are heated with 14–5 grams of N:N:N'-triethyl-ethylene diamine, 20 cc. of triethylamine and 50 cc. of absolute dioxane for 11 hours at 90–100° C. The crystalline magma is mixed with 150 cc. of 2 N-hydrochloric acid and stirred until dissolution is complete. The acid solution is extracted with ether to remove any neutral constituents, then filtered with charcoal and rendered alkaline with potassium carbonate. The benzene solution is freed from resinous constituents by filtration over aluminum oxide and the benzene is then distilled off in vacuo. The yellowish oil which remains behind crystallizes on being allowed to stand in a refrigerator. When recrystallized from isopropyl ether there is obtained 3-chloro-5:8-diethyl-piperazo-[c]-pyridazine of the formula

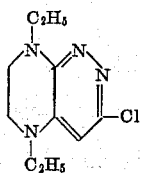

in the form of yellowish prisms melting at 69–69.5° C.

*Example 12*

18.3 grams of 3:4:6-trichloropyridazine are heated with 12 grams of N-ethyl-N':N'-dimethyl-ethylene diamine, 20 grams of triethylamine and 25 cc. of absolute dioxane for 14 hours at 90–100° C. The reaction mixture is dissolved in 2 N-hydrochloric acid and the solution extracted with ether to remove any netural constituents. The aqueous acid layer is then rendered alkaline by the addition of potassium carbonate and the precipitating base taken up in benzene. In order to remove any resinous impurities, the dry benzene solution is filtered over an aluminum oxide column. On evaporating the filtrate, a yellow oil is left behind which crystallizes spontaneously. 3 - chloro - 5-ethyl-8-methyl-piperazo[c]-pyridazine of the formula

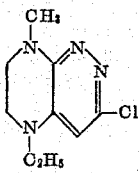

crystallizes from isopropyl ether in flat, yellowish prisms melting at 80–80.5° C.

*Example 13*

9.15 grams of 3:4:6-trichloropyridazine are heated with 12.7 grams of N:N'-dibenzyl-N-methyl-ethylene diamine and 6 grams of triethylamine for 45 minutes at 75° C. The temperature is maintained at 75–80° C. for 30 minutes, the mixture becoming partially solid. After adding 50 cc. of absolute dioxane stirring is carried on for 14 hours at 80–90° C.

After cooling, the mixture is acidified with 2 N-hydrochloric acid and evaporated to a great extent in vacuo to remove the dioxane. The residue is dissolved again in 2 N-hydrochloric acid and extracted with ether to remove the neutral constituents. The acid solution, after being filtered with charcoal, is rendered alkaline with potassium carbonate and the basic constituents extracted with methylene chloride. After distilling off the methylene chloride there remain 12.2 grams of a brown oil. After being dissolved in ethanol, evaporated and mixed with ether, a product crystallizes which melts at 123–126° C. It is identical with the 3-chloro-5-benzyl-8-methyl-piperazo-[c]-pyridazine described in Example 1.

The N:N'-dibenzyl-N-methyl-ethylene diamine used as starting material can be prepared as follows:

58 grams of chlorethylamine hydrochloride are added in portions in the course of one hour to 121 grams of benzyl methylamine in 300 cc. of ethanol at 20–30° C. with stirring. Stirring is ontinued overnight at 40–50° C., and the mixture is then boiled under reflux for 8 hours. The ethanol is distilled off, the residue is dissolved in 150 cc. of water and the solution saturated with pulverized potassium hydroxide. The oily base is taken up in hexane, the solution dried with potassium hydroxide pills, the hexane distilled off and the residue fractionated at a water jet vacuum. N-benzyl-N-methyl-ethylene diamine is obtained in the form of a colorless oil boiling at 122° C. under 13 mm. pressure of mercury.

44.3 grams of this diamine are boiled under reflux with 29 grams of freshly distilled benzaldehyde in 300 cc. of benzene, the water being separated by means of a water-separator. When the reaction is complete, the benzene is distilled off and the residue distilled in high vacuum. N-benzyl-N-methyl-N'-benzalethylene diamine boils at 136° C. under 0.3 mm. pressure of mercury.

58.9 grams of this Schiff's base are hydrogenated under normal pressure and at room temperature in 150 cc. of ethanol with 6 grams of Raney nickel. Hydrogenation ceases after the theoretical quantity of hydrogen has been taken up. The catalyst is filtered off, the ethanol distilled off and the base distilled in high vacuum. N:N'-dibenzyl-N-methyl-ethylene diamine boils at 111–112° C. under 0.08 mm. pressure of mercury and forms a colorless oil.

*Example 14*

7.95 grams of 3-chloro-5:8-dimethyl-piperazo-[c]-pyridazine are dissolved in 80 cc. of ethanol and hydrogenated with 0.5 gram of 10% palladium charcoal at room temperature under normal pressure. After the calculated quantity of hydrogen has been taken up, the operation is interrupted. From the highly concentrated solution the hydrochloride of 5:8-dimethyl-piperazo-[c]-pyridazine of the formula

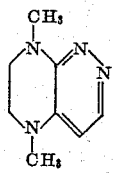

crystallized, and melts at 293° C. (with decomposition). It is hygroscopic.

*Example 15*

6.86 grams of 3-chloro-5-benzyl-8-methyl-piperazo-[c]-pyridazine are heated with 200 cc. of 17% ethanolic dimethylamine solution in a sealed tube for 20 hours at 180–190° C. The solution is evaporated, the residue dissolved in 2 N-hydrochloric acid, the solution filtered with charcoal and the filtrate rendered alkaline with saturated potassium carbonate solution. The precipitated base is taken up in methylene chloride, the methylene chloride solution washed with water, dried with sodium sulfate and evaporated. The residue, after being recrystallized from acetone, melts at 168–169° C. and is identical with the 3-dimethylamino-5-benzyl-8 - methyl - piperazo - [c]-pyridazine described in Example 4.

*Example 16*

14.4 grams of 3-chloro-5-benzyl-8-ethyl-piperazo-[c]-pyridazine are heated with a solution of 1.25 grams of sodium in 200 cc. of anhydrous methanol for 36 hours at 160–165° C. The solution is evaporated, the residue taken up in methylene chloride, the methylene chloride solution washed, dried and evaporated. In order to remove more easily small quantities of unreacted starting material by recrystallization, the residue is dissolved in ethanol and catalytically dehalogenated with 1 gram of palladium charcoal until no more hydrogen is taken up. After filtering off the catalyst, the solution is evaporated, the residue mixed with dilute caustic soda solution and extracted with methylene chloride. After distilling off the methylene chloride, the residue is recrystallized several times from acetone. 3-methoxy-5-benzyl-8-ethyl-piperazo-[c]-pyridazine of the formula

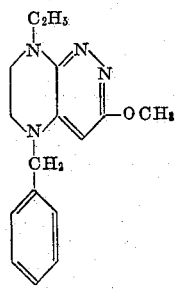

forms colorless prisms melting at 126–127° C.

What is claimed is:
1. 3-chloro-5-benzyl-8-methyl-piperazo-[c]-pyridazine.
2. 3-chloro-5-benzyl-8-ethyl-piperazo-[c]-pyridazine.
3. 3-dimethylamino-5-benzyl-8-methyl-piperazo-[c]-pyridazine.
4. 3-chloro-5-(β-dimethylamino-ethyl)-8-methyl-piperazo-[c]-pyridazine.
5. 3-methoxy-5-benzyl-8-ethyl-piperazo-[c]-pyridazine.
6. 3-chloro-5-(meta-methoxy-benzyl)-8-ethyl-piperazo-[c]-pyridazine.
7. A member selected from the group consisting of compounds of the formula

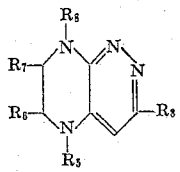

wherein $R_3$ represents a member selected from the group consisting of hydrogen, halogen, lower alkoxy and lower di-alkylamino, $R_5$ stands for a member selected from the group consisting of lower alkyl, di-lower alkylamino lower alkyl, benzyl, di-lower alkylamino benzyl, lower alkoxy benzyl and halobenzyl, $R_6$ and $R_7$ each represents a member selected from the group consisting of hydrogen and lower alkyl and $R_8$ is a member selected from the group consisting of lower alkyl, benzyl, di-lower alkylamino benzyl, lower alkoxy benzyl and halobenzyl, and therapeutically useful acid-addition salts thereof.

8. A process for the manufacture of new heterocyclic piperazo-[c]-piperazines which are substituted in the 5- and 8-positions which comprises reacting a compound of the formula

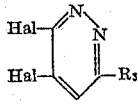

wherein $R_3$ stands for a member selected from the group consisting of hydrogen and halogen and Hal represents a member selected from the group consisting of chlorine and bromine, with an ethylene diamine of the formula

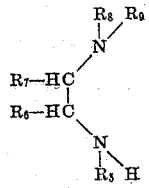

wherein $R_5$ stands for a member selected from the group consisting of lower alkyl, di-lower alkylamino lower alkyl, benzyl, di-lower alkylamino benzyl, lower alkoxyl benzyl and halobenzyl, $R_6$ and $R_7$ each represents a member selected from the group consisting of hydrogen and lower alkyl and $R_8$ and $R_9$ each represents a member selected from the group consisting of lower alkyl, benzyl, di-lower alkylamino benzyl, lower alkoxy benzyl and halobenzyl.

9. A process for the manufacture of new heterocyclic piperazo-[c]-piperazines which are substituted in the 5- and 8-positions which comprises reacting a compound of the formula

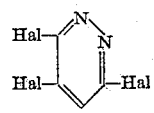

wherein Hal represents a member selected from the group consisting of chlorine and bromine, with an ethylene diamine of the formula

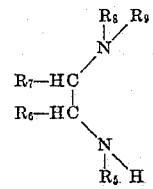

wherein $R_5$ stands for a member selected from the group consisting of lower alkyl, di-lower alkylamino lower alkyl, benzyl, di-lower alkylamino benzyl, lower alkoxy benzyl and halobenzyl, $R_6$ and $R_7$ each represents a member selected from the group consisting of hydrogen and lower alkyl and $R_8$ and $R_9$ each represents a member selected from the group consisting of lower alkyl, benzyl, di-lower alkylamino benzyl, lower alkoxy benzyl and halobenzyl, and converting in the 3-halogeno-piperazo-[c]-pyridazine compound obtained the halogen atom into a member selected from the group consisting of hydroxy, mercapto, lower alkoxy and lower alkylmercapto groups and free and alkylated amino groups.

10. A therapeutically useful acid addition salt of the compound of claim 1.
11. A therapeutically useful acid addition salt of the compound of claim 2.

References Cited in the file of this patent

UNITED STATES PATENTS 2,577,039    Roth _____ Dec. 4, 1951

FOREIGN PATENTS 573,244    Great Britain _____ Nov. 13, 1945